United States Patent Office 2,809,970
Patented Oct. 15, 1957

2,809,970

STABLE THIAMINE AND PYRIDOXINE HYDROCHLORIDE SOLUTIONS

Philip A. Kober, Detroit, Mich., assignor to Sherman Laboratories, Detroit, Mich., a partnership No Drawing. Application May 31, 1952, Serial No. 291,077

9 Claims. (Cl. 260—256.6)

This invention relates to a composition of matter and particularly to vitamin solutions of the hydrochloride type, namely, thiamine hydrochloride and pyridoxine hydrochloride, otherwise known as vitamins $B_1$ and $B_6$, respectively.

Pure thiamine and pyridoxine hydrochloride solutions are colorless when freshly made; but one of the difficulties encountered in connection with these vitamin solutions, particularly those containing substantial amounts of thiamine and pyridoxine such as are used in parenteral therapy, is that such solutions, upon standing at room temperatures, deteriorate as is evidenced by developing a yellow color. The extent to which this yellow color develops depends upon various factors such as the concentration of the thiamine or pyridoxine in the solution and the temperature at which and the length of time the solution is permitted to stand. As stated above the appearance of this yellow color in these solutions is evidence of a deteriorated product; and when the development of this color necessitates discarding of the solution, particularly parenteral solutions of these vitamins, it represents a considerable economic loss.

It is therefore the object of this invention to produce stable aqueous vitamin solutions of the hydrochloride type and a method of making such solutions.

I have found that the stability and the length of time that a thiamine or pyridoxine solution will remain colorless upon standing can be greatly increased by the incorporation in the solution of a relatively small amount of sodium formaldehyde sulfoxylate. It is generally well known that sodium formaldehyde sulfoxylate is a compound derived from sulphur dioxide and is considered as a derivative of sulphites. It is also generally well known that sulphites have a deleterious effect on thiamine and are considered incompatible therewith. The rendering of these solutions more stable by the addition thereto of sodium formaldehyde sulfoxylate was therefore a result quite unexpected. Instead of being incompatible with thiamine solutions, sodium formaldehyde sulfoxylate actually serves as a preservative.

Thiamine and pyridoxine hydrochloride solutions are acid in nature. These solutions normally have a hydrogen ion concentration (pH) of from about 1.8 to 2.5. In practicing the present invention the process includes the step of first partially neutralizing the acid in the hydrochloride solution by the addition of a suitable alkali such as sodium bicarbonate or ammonium hydroxide. Enough alkali is added to the thiamine or pyridoxine hydrochloride solution to change the pH to from about 3.0 to 5.0 preferably to a value within the range of 3.5 to 4.0. After the solution is neutralized in this manner, the sodium formaldehyde sulfoxylate may be added and stirred into the solution.

Only a small amount, preferably from one to two tenths of one percent, of sodium formaldehyde sulfoxylate is required to substantially increase the stability of the hydrochloride solutions. After stirring the sodium formaldehyde sulfoxylate into the solution, the solution, which is clear, is heated to about 60° C. for about 30 to 60 minutes. The solution is then ready for bottling or ampuling. I have found that it is advisable to adjust the pH of the hydrochloride solution from about 3.5 to 4.0 prior to the addition of sodium formaldehyde sulfoxylate in order to prevent the decomposition of the sodium formaldehyde sulfoxylate by the acid in the hydrochloride solution. I have also found that the subsequent step of heating the solution after addition of the sodium formaldehyde sulfoxylate is very desirable for the purpose of hastening the complete stabilizing action of the sodium formaldehyde sulfoxylate on the solution.

The following example will suffice to clearly demonstrate the manner in which such stable hydrochloride vitamin solutions are prepared:

One hundred grams of thiamine hydrochloride or pyridoxine hydrochloride are dissolved in sufficient distilled water to make 1,000 cc. Thereafter, sufficient sodium bicarbonate (approximately 3 grams) is stirred into the hydrochloride solution so that it has a pH value of from about 3.5 to 4.0. Then 1.0 gram of finely ground sodium formaldehyde sulfoxylate is stirred into the solution and the solution is heated in a water bath to about 60° C. for about 30 minutes. The solution is then cooled to room temperature. If desired, there may be added to the thus cooled solution two percent of benzyl alcohol which serves as a bacteriological preservative. The solution is thereafter sterilely filtered to remove from the solution any dust particles and sediment after which the solution is ready to be subdivided into ampuls and vials.

Thus, it will be seen that I have provided a simple method, but very effective, of improving the stability of normally unstable solutions of vitamins $B_1$ and $B_6$ by the addition to such hydrochloride solutions of sodium formaldehyde sulfoxylate in a very small amount. These vitamin solutions of the hydrochloride type, when produced in accordance with the present invention, show remarkable improvement with respect to their stability upon standing as compared with such solutions which do not contain sodium formaldehyde sulfoxylate.

I claim:

1. A composition of matter comprising an aqueous vitamin solution selected from the group consisting of thiamine hydrochloride and pyridoxine hydrochloride and containing sodium formaldehyde sulfoxylate dissolved therein.

2. A composition of matter comprising an aqueous vitamin solution selected from the group consisting of thiamine hydrochloride and pyridoxine hydrochloride and containing sodium formaldehyde sulfoxylate, said solution having a pH value of from about 3.0 to 5.0.

3. A composition of matter comprising an aqueous vitamin solution selected from the group consisting of thiamine hydrochloride and pyridoxine hydrochloride and containing less than 1% of sodium formaldehyde sulfoxylate.

4. The composition of matter called for in claim 3 wherein said sodium formaldehyde sulfoxylate comprises from one to two tenths of one percent of said solution.

5. The method of producing stable aqueous vitamin solutions selected from the group consisting of thiamine hydrochloride and pyridoxine hydrochloride which comprises the steps of dissolving vitamins in water to form a solution, adjusting the pH of said solution to a predetermined value by the addition to said solution of an alkali, and thereafter adding to said solution a small amount of sodium formaldehyde sulfoxylate.

6. The method of producing stable aqueous vitamin solutions selected from the group consisting of thiamine hydrochloride and pyridoxine hydrochloride which comprises the steps of dissolving the vitamin in water to form a solution, adjusting the pH value of said solution to substantially 3.0 to 5.0, and thereafter adding to said solution a small amount of sodium formaldehyde sulfoxylate.

7. The method of producing stable aqueous vitamin solutions selected from the group consisting of thiamine hydrochloride and pyridoxine hydrochloride which comprises the steps of dissolving the vitamin in water to form a solution, adjusting the pH value of said solution to substantially 3.0 to 5.0, and thereafter adding to said solution a small amount of sodium formaldehyde sulfoxylate, and heating said solution to approximately 60° C.

8. The method of increasing the stability of an aqueous vitamin solution selected from the group consisting of thiamine hydrochloride and pyridoxine hydrochloride which comprises adding to said solution a small amount of sodium formaldehyde sulfoxylate.

9. The method of increasing the stability of an aqueous vitamin solution selected from the group consisting of thiamine hydrochloride and pyridoxine hydrochloride which comprises the steps of adjusting the pH value of said solution to a value within the range of from about 3.5 to 4.0 and thereafter dissolving in said solution a small amount of sodium formaldehyde sulfoxylate.

References Cited in the file of this patent

Krantz, Jr. et al.: J. Am. Pharm. Assoc., 25, 979–981 (1936).